No. 853,367. PATENTED MAY 14, 1907.
J. A. MALORY.
COMBINED BRIER CANE PRUNER AND GRAPNEL.
APPLICATION FILED MAR. 16, 1907.

Witnesses:
G. B. Cornelius
C. O. Gibbons

Inventor:
James A. Malory
by Eugene Ayres,
Attorney.

UNITED STATES PATENT OFFICE.

JAMES ANDREW MALORY, OF HALLS, MISSOURI.

COMBINED BRIER-CANE PRUNER AND GRAPNEL.

No. 853,367. Specification of Letters Patent. Patented May 14, 1907.

Application filed March 16, 1907. Serial No. 362,779.

*To all whom it may concern:*

Be it known that I, JAMES ANDREW MALORY, a citizen of the United States, residing at Halls, in the county of Buchanan and State of Missouri, have invented certain new and useful Improvements in a Combined Brier-Cane Pruner and Grapnel; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Persons experienced in the culture of fruit, particularly blackberries and other fruits having thorny canes and branches, are aware of the difficulty with which they are trimmed or the dead cane cut out and removed from the rows or patch where grown.

The object of my invention is to provide an implement by the use of which, scratching of the person and injury to the clothing are obviated, and by which the cutting out of dead cane near the roots and the removal of the same, are greatly facilitated.

Figure 2:
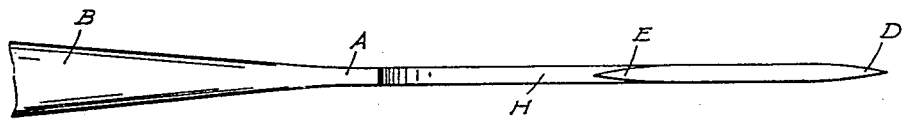
Figure 1:
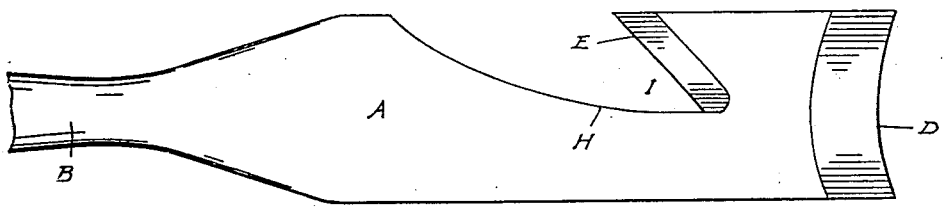

I accomplish my object by the implement illustrated in the accompanying drawings, in which Figure 1 is a side view of the body, blades and dragnel, the handle broken away; Fig. 2 is a front edge view of the same, and Fig. 3 a side view with a handle attached.

Similar letters refer to similar parts in the several views.

In said drawings A is the flat metal body of the implement, B the tubular grip end of said body, and C a handle of any desired length which may be riveted in said tubular grip end.

Figure 3:

D is an end blade especially designed for driving down to the dead cane found in the rows and cutting the same out close to the roots. This blade has a slight incurve, as shown in Figs. 1 and 3, to prevent the cane slipping off before it is severed by the blade. E is a blade facing in the opposite direction: this permits the device to be used among cane only partly dead by pushing it in among the cane and back of such briers as should be trimmed out, and by then jerking said blade E forward, severing the cane. Edge H is cast blunt, so that, as the trimming is being done, or at other times, the cane thus cut or trimmed can be readily removed by catching the same in the cove-like recess I formed by said blade E and edge H and dragging it out from the live cane.

While the primary object of this implement is to remove the dead cane and branches from blackberries and raspberries, it is also adapted for use in trimming gooseberries and currants, water sprouts around trees, limbs of trees, and like purposes.

What I claim and desire to obtain by Letters Patent, is:—

In a brier cane pruner and grapnel a flat metal body, a handle, an incurved blade at the opposite end, an oppositely turned blade bearing rearwardly from its inner to its outer end, a blunt edge bearing rearwardly and outwardly, said blade and blunt edge forming a recess for dragging out the dissevered cane, substantially as shown and described.

In testimony whereof, I affix my signature, in presence of two witnesses:

JAMES ANDREW × MALORY.
his mark

Witnesses:
EVANGELINE O. GIBBONS,
JOHN STUBER.